US008908543B2

(12) United States Patent
Kim et al.

(10) Patent No.: US 8,908,543 B2
(45) Date of Patent: Dec. 9, 2014

(54) APPARATUS AND METHOD FOR SEMI DISTRIBUTED RESOURCE ALLOCATION IN A COGNITIVE RADIO WIRELESS COMMUNICATION SYSTEM

(75) Inventors: Sang-Bum Kim, Seoul (KR); Ho-Dong Kim, Gwacheon-si (KR); Dong-In Kim, Seongnam-si (KR); Eun-Taek Lim, Suwon-si (KR); Woo-Jin Shin, Suwon-si (KR); Kyoung-Youp Park, Suwon-si (KR)

(73) Assignees: Samsung Electronics Co., Ltd., Suwon-Si (KR); Sungkyunkwan University Foundation for Corporate Collaboration, Suwon-Si (KR)

( * ) Notice: Subject to any disclaimer, the term of this patent is extended or adjusted under 35 U.S.C. 154(b) by 828 days.

(21) Appl. No.: 12/661,140

(22) Filed: Mar. 11, 2010

(65) Prior Publication Data
US 2010/0232307 A1    Sep. 16, 2010

(30) Foreign Application Priority Data

Mar. 13, 2009  (KR) ........................ 10-2009-0021539

(51) Int. Cl.
| H04J 1/16 | (2006.01) |
| H04L 5/00 | (2006.01) |
| H04W 72/04 | (2009.01) |
| H04W 52/26 | (2009.01) |
| H04W 16/14 | (2009.01) |

(52) U.S. Cl.
CPC ........ *H04W 72/0426* (2013.01); *H04W 52/267* (2013.01); *H04L 5/0032* (2013.01); *H04W 16/14* (2013.01); *H04L 5/0062* (2013.01); *H04L 5/006* (2013.01); *H04W 52/265* (2013.01)

USPC ........... 370/252; 370/328; 370/329; 370/311; 370/318; 455/522; 455/69

(58) Field of Classification Search
CPC ......... H04J 1/16; H04W 72/00; H04W 16/14; H04W 52/243; H04W 72/082; H04W 72/02
USPC ......... 370/252, 329, 311, 318, 328, 316, 561, 370/260; 455/522, 69, 302, 63, 561, 423, 455/67.11
See application file for complete search history.

(56) References Cited

U.S. PATENT DOCUMENTS

| 5,732,328 | A | * | 3/1998 | Mitra et al. ...................... 455/69 |
| 6,366,778 | B1 | * | 4/2002 | Bender et al. ................. 455/442 |
| 7,876,704 | B1 | * | 1/2011 | Bims et al. ..................... 370/254 |
| 8,036,151 | B2 | * | 10/2011 | Das et al. ....................... 370/311 |
| 2005/0152442 | A1 | * | 7/2005 | Duvaut et al. ................. 375/222 |
| 2005/0190822 | A1 | * | 9/2005 | Fujii et al. ..................... 375/211 |
| 2008/0291831 | A1 | * | 11/2008 | Alpert et al. .................. 370/236 |

FOREIGN PATENT DOCUMENTS

WO    WO2008069796    *    6/2008    ............... H04B 7/06

* cited by examiner

*Primary Examiner* — Jamal Javaid

(57) ABSTRACT

An apparatus and operation method of a Base Station (BS) for allocating a radio resource in a Cognitive Radio (CR) wireless communication system includes, when a licensed system is activated, determining whether each of User Terminals (UTs) located in a cell satisfies Quality of Service (QoS). If all of the UTs satisfy the QoS, a binary message indicating 'on' is broadcasted to neighbor BSs. If at least one of the UTs does not satisfy the QoS, a binary message indicating 'off' is broadcasted to the neighbor BSs, and when the binary message indicating 'off' is received from at least one of the neighbor BSs, the binary message indicating 'off' is broadcasted to the UTs.

20 Claims, 4 Drawing Sheets

US 8,908,543 B2

APPARATUS AND METHOD FOR SEMI DISTRIBUTED RESOURCE ALLOCATION IN A COGNITIVE RADIO WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Mar. 13, 2009 and assigned Serial No. 10-2009-0021539, the entire disclosure of which is hereby incorporated by reference.

TECHNICAL FIELD OF THE INVENTION

The present invention relates to a Cognitive Radio (CR) wireless communication system. More particularly, the present invention relates to an apparatus and method for allocating a radio resource in a CR wireless communication system.

BACKGROUND OF THE INVENTION

Recently, several types of communication systems coexist with the development of wireless communication techniques. Examples of the systems include a wireless communication system using a Code Division Multiple Access (CDMA) scheme referred to as a $2^{nd}$ generation technique, a wireless communication system using an International Mobile Telecommunications (IMT)-2000 scheme referred to as a $3^{rd}$ generation technique, and a system using an Orthogonal Frequency Division Multiple (OFDM) access scheme referred to as a $4^{th}$ generation technique. In this case, the coexisting systems use different communication schemes and provide services by the use of different frequency bands. However, since limited frequency resources are used for wireless communication, there is a problem in that the frequency resources are insufficient to allow coexistence of a large number of systems.

Accordingly, there is ongoing research on a Cognitive Radio (CR) technique which uses a temporarily unused frequency band (or channel) among pre-allocated frequency bands in use. That is, even if a system is licensed for the use of a specific frequency band, the entire band is not always used. Therefore, the CR wireless communication system searches for a channel temporarily unused by the licensed system, and then provides a service through the found channel to user terminals within a service area. For example, temporarily unused frequency bands can be used among frequency bands allocated for transmission of a television (TV) signal. Herein, the licensed system is referred to as a Primary User (PU), and the CR system is referred to as a Secondary User (SU).

In order for the SU to overcome a constraint caused by the PU and to perform smooth communication, a proper resource allocation policy is required. The resource allocation policy is classified into a centralized mechanism and a distributed mechanism. The centralized mechanism is a mechanism in which a resource is allocated by a higher node such as a Base Station (BS). The distributed mechanism is a mechanism in which a resource is allocated by each user terminal. However, a special condition of the CR wireless communication system is not considered in the well-known resource allocation mechanisms. Accordingly, there is a need to propose a resource allocation method suitable for the CR wireless communication system.

SUMMARY OF THE INVENTION

To address the above-discussed deficiencies of the prior art, it is a primary aspect of the present invention is to provide an apparatus and method for performing resource allocation by considering interference to a licensed system in a Cognitive Radio (CR) wireless communication system.

Another aspect of the present invention is to provide an apparatus and method for performing resource allocation in a semi-distributed manner in a CR wireless communication system.

Another aspect of the present invention is to provide an apparatus and method for determining whether a User Terminal (UT) regulates maximum Transmit (Tx) power in a CR wireless communication system.

Another aspect of the present invention is to provide an apparatus and method for determining whether an UT regulates maximum Tx power according to a Quality of Service (QoS) satisfaction status of the UT in a CR wireless communication system.

Another aspect of the present invention is to provide an apparatus and method for determining maximum Tx power by considering Tx power, data rate, and fairness of resource usage of an UT in a CR wireless communication system.

In accordance with an aspect of the present invention, a method of operating a Base Station (BS) in a CR wireless communication system is provided. The method includes, when a licensed system is activated, determining whether each of UTs located in a cell satisfies QoS; if all of the UTs satisfy the QoS, broadcasting a binary message indicating 'on' to neighbor BSs; if at least one of the UTs does not satisfy the QoS, broadcasting a binary message indicating 'off' to the neighbor BSs; and when the binary message indicating 'off' is received from at least one of the neighbor BSs, broadcasting the binary message indicating 'off' to the UTs.

In accordance with another aspect of the present invention, a method of operating an UT in a CR wireless communication system is provided. The method includes, when a licensed system is activated, determining per-subcarrier Tx power according to a water filling mechanism in such a manner that a sum of the per-subcarrier Tx power does not exceed maximum Tx power; upon receiving a binary message indicating 'off' from a BS, determing a Penalty Factor (PF) by using at least one of the maximum Tx power, the per-subcarrier Tx power, a per-subcarrier data rate, a minimum required data rate, and a threshold coefficient for a maximum allowed data rate; and regulating maximum Tx power by multiplying the PF by current maximum Tx power.

In accordance with another aspect of the present invention, a BS apparatus in a CR wireless communication system is provided. The apparatus includes a determination module for determining whether each of UTs located in a cell satisfies QoS when a licensed system is activated, a determination module configured to broadcast a binary message indicating 'on' to neighbor BSs if all of the UTs satisfy the QoS, a binary message indicating 'off' to the neighbor BSs if at least one of the UTs does not satisfy the QoS, and the binary message indicating 'off' to the UTs when the binary message indicating 'off' is received from at least one of the neighbor BSs, and a transmitter configured to transmit the binary messages.

In accordance with another aspect of the present invention, aa UT apparatus in a CR wireless communication system is provided. The apparatus includes a determination module configured to determine per-subcarrier Tx power according to a water filling mechanism in such a manner that a sum of the per-subcarrier Tx power does not exceed maximum Tx power when a licensed system is activated, and a calculation module configured to determine, upon receiving a binary message indicating 'off' from a BS, a PF by using at least one of the maximum Tx power, the per-subcarrier Tx power, a per-subcarrier data rate, a minimum required data rate, and a threshold coefficient for a maximum allowed data rate, wherein the determination module regulates maximum Tx power by multiplying the PF by current maximum Tx power.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its features, reference is now made to the following description taken in conjunction with the accompanying drawings, in which like reference numerals represent like parts.

DETAILED DESCRIPTION OF THE INVENTION

Figure 1:
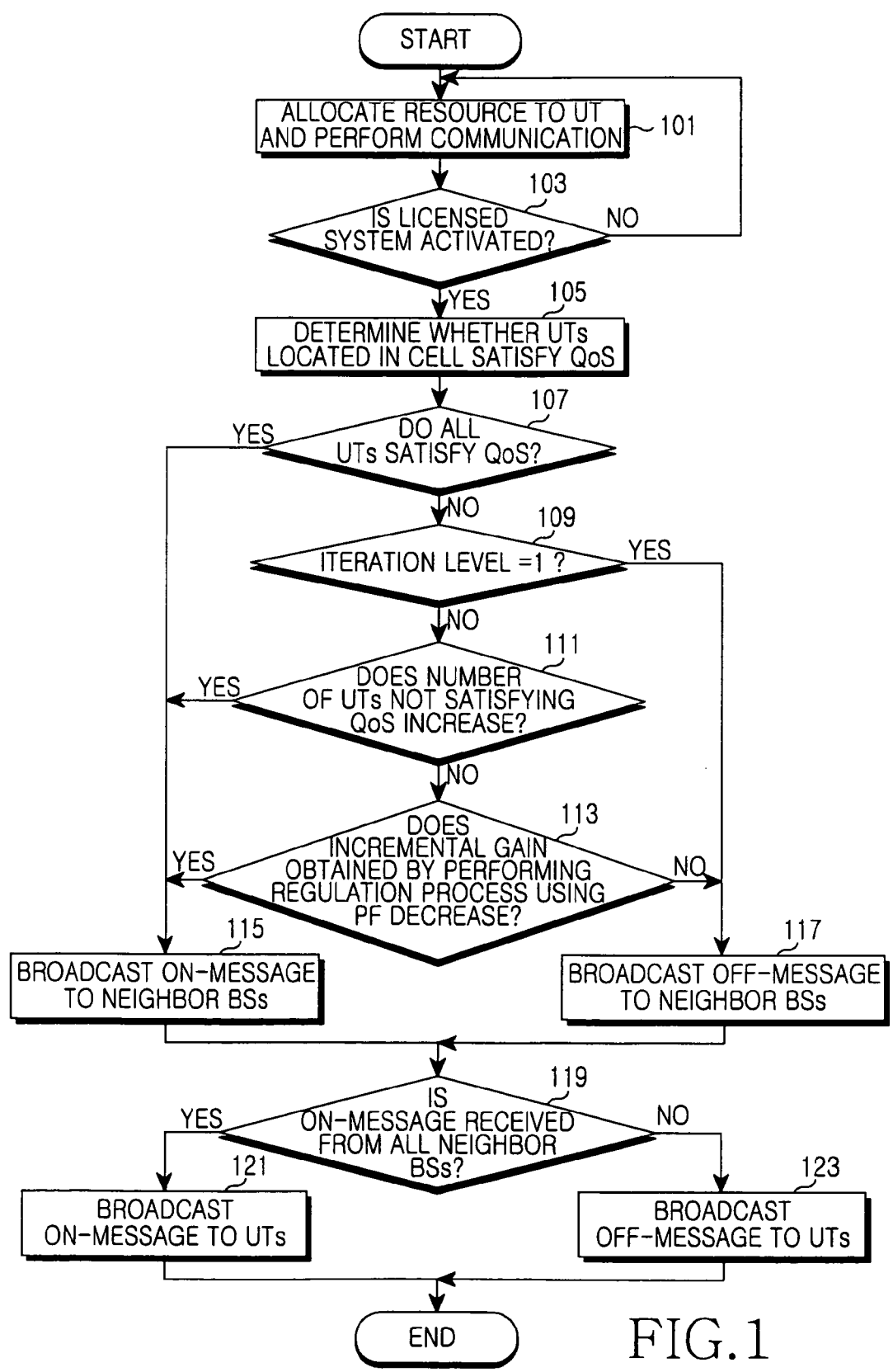
FIG. 1 illustrates a process of a Base Station (BS) in a Cognitive Radio (CR) wireless communication system according to an embodiment of the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Hereinafter, a technique of the present invention for effective resource allocation in a Cognitive Radio (CR) wireless communication system will be described. In particular, the present invention describes semi-distributed resource allocation in which a characteristic of a distribution mechanism is partially applied. Although Orthogonal Frequency Division Multiplexing (OFDM)/Orthogonal Frequency Division Multiple Access (OFDMA)-based wireless communication system will be described hereinafter as an example, the present invention can also apply to other types of wireless communication systems.

In the present invention, each Base Station (BS) broadcasts information indicating its cell condition to neighbor BSs. Upon obtaining information that indicates the condition of each cell from the neighbor BSs, each BS broadcasts the condition of its cell to User Terminals (UTs) located in the cell of each BS. In this case, to minimize overhead, each BS broadcasts an on/off binary message consisting of one bit.

Each BS broadcasts a binary message indicating 'on' to the neighbor BSs in the following situations. In a first situation, all UTs located in a cell of a BS satisfy a Quality of Service (QoS) constraint. The QoS constraint can be implemented in various forms. For example, the QoS constraint can be expressed with at least one of a data rate, channel quality (i.e., a Signal to Noise Ratio (SNR), a Signal to Interference and Noise Ratio (SINR), and such), and so forth. In a second situation, the number of UTs not satisfying the QoS increases. In a third situation, an incremental gain obtained by a resource regulation process according to the present invention described below decreases. Whether the incremental gain increases or decreases is determined according to whether a Penalty Factor (PF) defined below exceeds a predefined threshold. In a different situation other than the above three situations, each BS broadcasts a binary message indicating 'off' to the neighbor BSs.

Each BS broadcasts the binary message to UTs located in its cell in the following manner. If the binary message indicating 'on' is received from all neighbor BSs, each BS broadcasts the binary message indicating 'on' to the UTs. Alternatively, if at least one binary message indicating 'off' is received from the neighbor BSs, each BS broadcasts the binary message indicating 'off' to the UTs.

Parameters used for explaining the present invention are defined as follows.

If a UT consumes small power to transmit data to a BS, the UT can perform communication for a longer period of time by using a limited battery capacity. Therefore, a UT that consumes greater power under a maximum power constraint has more penalties. The present invention defines a parameter of Equation 1 below to express a penalty level related to the power consumption.

$$PP_i = \frac{\sum_{k \in S_i} P_{i,k}}{P_i^{max}}, i = 1, 2, \ldots, L \qquad \text{[Eqn. 1]}$$

In Equation 1, $PP_i$ denotes a Power Penalty (PP) parameter of a UTi, k denotes a subcarrier index, $S_i$ denotes a subcarrier set allocated to the UTi, $P_{i,k}$ denotes power used for a subcarrier k of the UTi, $Pr_i^{max}$ denotes maximum power of the UTi, and L denotes the number of UTs.

Even if other UTs do not satisfy a minimum required data rate, when a specific UT achieves a significantly higher data rate than its minimum required data rate, the specific UT has a penalty in terms of fairness. The present invention defines a parameter of Equation 2 below to express a penalty level related to the data rate.

$$RP_i = \frac{\log\left(\sum_{k \in S_i} R_{i,k} / R_i^{min}\right)}{\log(\varepsilon)}, i = 1, 2, \ldots, L \qquad \text{[Eqn. 2]}$$

In Equation 2, $RP_i$ denotes a Rate Penalty (RP) parameter of a UTi, k denotes a subcarrier index, $S_i$ denotes a subcarrier set allocated to the UTi, $R_{i,k}$ denotes a data rate at a subcarrier k, $R_i^{min}$ denotes a minimum data rate of the UTi, ε denotes a threshold coefficient for a maximum allowed data rate, and L denotes the number of UTs.

The use of the coefficient ε included in Equation 2 above can avoid a phenomenon in which the UT achieves a significantly higher data rate than its minimum required data rate. If the coefficient ε is set to '2', this implies that the data rate allowed to be achieved is less than or equal to a double of its minimum required data rate.

According to an amount of power consumed by the UTs and in accordance with a data rate achieved in each subcarrier, a parameter related to fairness is defined by Equation 3:

$$FG_i = \prod_{k \in S_i} \lambda_{i,k}, \ i = 1, 2, \ldots, L \qquad \text{[Eqn. 3]}$$

In Equation 3, $FG_i$ denotes a Fairness Gain (FG) parameter of an UTi, k denotes a subcarrier index, $S_i$ denotes a subcarrier set allocated to the UTi, $\lambda_{i,k}$ denotes a quality indicator for a subcarrier k of the UTi, and L denotes the number of UTs. Herein, $\lambda_{i,k}$ is defined by Equation 4:

$$\lambda_{i,k} = \alpha_{i,k} / \beta_{i,k} \qquad \text{[Eqn. 4]}$$

$$\alpha_{i,k} = R_{i,k} / \sum_{k \in S_i} R_{i,k}$$

$$\beta_{i,k} = P_{i,k} / \sum_{k \in S_i} P_{i,k}$$

In Equation 4 above, $\lambda_{i,k}$ denotes a quality indicator for a subcarrier k of an UTi, $\alpha_{i,k}$ denotes a ratio of a data rate for the subcarrier k of the UTi to a total data rate, $\beta_{i,k}$ denotes a ratio of power for the subcarrier k of the UTi to total power, k denotes a subcarrier index, $S_i$ denotes a subcarrier set allocated to the UTi, $R_{i,k}$ denotes a data rate at the subcarrier k, and $P_{i,k}$ denotes power used for the subcarrier k of the UTi.

In the FG parameter defined in Equation (3) above, if the quality indicator $\lambda_{i,k}$ is high, it implies the subcarrier k uses relatively greater power to achieve a current data rate, and if the quality indicator $\lambda_{i,k}$ is low, it implies that the subcarrier k uses relatively small power to achieve the current data rate. That is, a subcarrier corresponding to the high quality indicator $\lambda_{i,k}$ has relatively poor quality, and a subcarrier corresponding to the low quality indicator $\lambda_{i,k}$ has relatively good quality. Therefore, the FG parameter defined as the product of the quality indicators $\lambda_{i,k}$ indicates a quality difference level between allocated subcarriers.

The present invention defines a Penalty Factor (PF) which is obtained by combining the PP parameter, the RP parameter, and the FG parameter is defined by Equation 5:

$$PF_i(s+1) = \left[ \frac{1}{RP_i(s) + PP_i(s) - FG_i(s)} \right]^1_{PF_i^{min}}, \qquad \text{[Eqn. 5]}$$

$$i = 1, 2, \ldots, L$$

In Equation 5, s denotes an iteration count index, $PF_i(s)$ denotes an $s^{th}$ PF of an UTi, $RP_i(s)$ denotes an $s^{th}$ RP parameter of the UTi, $PP_i(s)$ denotes an $s^{th}$ PP parameter of the UTi, $FG_i(s)$ denotes an $s^{th}$ FG parameter of the UTi, $[x]^b_a$ denotes a smaller value between b and a value which is greater between x and a, $PF_i^{min}$ denotes a minimum value of a PF of the UTi, and L denotes the number of UTs. A situation in which the PF of the UTi decreases unnecessarily to a small value can be avoided by the value $PF_i^{min}$.

The PF is used to determine maximum Transmit (Tx) power of the UT. When a binary message indicating 'off' is received from the BS, the UT determines the maximum Tx power by Equation 6:

$$P_i^{max}(S+1) = P_i^{max}(S) \times PF(s+1)_i, \ i = 1, 2, \ldots, L \qquad \text{[Eqn. 6]}$$

In Equation 6, s denotes an iteration count index, $P_i^{max}(s)$ denotes $s^{th}$ maximum Tx power of an UTi, $PF_i(s)$ denotes an $s^{th}$ PF of the UTi, and L denotes the number of UTs.

According to the definition of the aforementioned parameters, a high PP parameter implies that relatively greater power is consumed, and a high RP parameter implies that a currently achieved data rate is at least ε times higher than a minimum required data rate. Therefore, in the PF, the PP parameter and the RP parameter have a positive sign. In addition, a high FG parameter implies that allocated subcarriers have a similar quality. Thus, in the PF, the FG parameter has a negative sign.

If the UT has a small PF, the following attributes are predicted. First, the UT achieves a higher data rate than a minimum required data rate. Second, the UT consumes relatively great power under the maximum power constraint. Third, a quality difference is relatively great between subcarriers allocated to the UT.

On the other hand, if the UT has a high PF, the following attributes are predicted. First, a current data rate of the UT is less than the minimum required data rate. Second, the UT consumes relatively small power under the maximum power constraint. Third, the quality difference is relatively small between the subcarriers allocated to the UT.

An important component of the PF is the RP parameter, and the reason thereof is as follows. First, if the UT reduces maximum Tx power according to the PF, a total available power amount of the UT decreases, and the power used by the UT approximates to the maximum available power. As a result, the PP parameter of the UT approximates to 1. Second, if the UT reduces the maximum Tx power according to the PF, power allocated to a subcarrier with poor quality decreases or the subcarrier with poor quality is not used, and thus the FG parameter of the UT approximates to 1. If the PP parameter and the FG parameter approximate to 1 due to the aforementioned reasons, the RP parameter an important component for determining a value of the PF.

Hereinafter, operations and structures of a BS and a UT according to the aforementioned semi-distributed resource allocation will be described in detail with reference to the accompanying drawings.

FIG. 1 illustrates a process of a BS in a CR wireless communication system according to an embodiment of the present invention.

Referring to FIG. 1, the BS allocates a resource to UTs, and performs communication by using the resource in block 101. In this case, a licensed system is in an inactive state. In other words, the licensed system is not using a resource of a frequency band used by the BS.

In block 103, the BS determines whether the licensed system is activated. That is, the BS persistently senses a signal of the licensed system while performing communication, and determines whether the signal of the licensed system is detected. The activation of the licensed system can be determined not only by the sensing from the BS but also by a report from the UTs. If the licensed system is not activated, returning to block 101, the BS continuously communicates with the UTs.

Otherwise, if the licensed system is activated, proceeding to block 105, the BS determines whether each of the UTs located in a cell satisfies QoS. In this case, whether the QoS is satisfied is determined by using at least one of a data rate and channel quality. For example, the BS determines whether a data rate of each UT is greater than a minimum data rate or whether a channel quality value of each UT is greater than a threshold. The channel quality is represented by an SNR, an SINR, and such.

After determining whether each UT satisfies the QoS, proceeding to block 107, the BS determines whether all of the UTs satisfy the QoS. If all of the UTs satisfy the QoS, the procedure proceeds to block 115. Otherwise, if at least one of the UTs does not satisfy the QoS, proceeding to block 109, the BS determines whether a current iteration level is '1'. In other words, the BS determines whether the UT performs a maximum Tx power regulation process at least one time by using a binary message. If the iteration level is '1', the procedure proceeds to block 117.

Otherwise, if the iteration level is not '1', proceeding to block 111, the BS determines whether the number of UTs not satisfying the QoS increases. That is, the BS determines whether the number of UTs not satisfying the QoS in a current iteration level is greater than the number of UTs not satisfying the QoS in a previous iteration level. If the number of UTs not satisfying the QoS increases, this implies that a communication environment is not improved through maximum Tx power regulation, and thus the procedure proceeds to block 115.

Otherwise, if the number of UTs not satisfying the QoS decreases or does not change, proceeding to block 113, the BS determines whether an incremental gain obtained by performing a regulation process using a PF decreases. Herein, the incremental gain denotes a variation of UT's Tx power based on the PF. Whether the incremental gain increases or decreases is determined according to whether the PF exceeds a pre-defined threshold. Since a plurality of UTs have different PFs, a detailed method for considering the PFs is required. For example, if values of all of the PFs exceed the threshold, or if an average value of the PFs exceeds the threshold, or if a ratio of the PFs exceeding the threshold is greater than or equal to a specific level, the BS determines that the incremental gain decreases.

If the incremental gain decreases, proceeding to block 115, the BS broadcasts a binary message indicating 'on' to neighbor BSs. Herein, the binary message may be transmitted in a format of a Co-existence Beacon Protocol (CBP) packet by using a Self-Coexistence Window (SCW) slot.

Otherwise, if the incremental gain does not decrease, proceeding to block 117, the BS broadcasts a binary message indicating 'off' to the neighbor BSs. Herein, the binary message may be transmitted in the format of the CBP packet by using the SCW slot.

In block 119, the BS determines whether the binary message indicating 'on' is received from all neighbor BSs. Herein, the binary message may be received in the format of the CBP packet by using the SCW slot.

If the binary message indicating 'on' is received from all neighbor BSs, proceeding to block 121, the BS transmits the binary message indicating 'on' to the UTs located in the cell. That is, the BS instructs the UTs to maintain current maximum Tx power.

Otherwise, if the binary message indicating 'off' is received from at least one of the neighbor BSs, proceeding to block 123, the BS transmits the binary message indicating 'off' to the UTs located in the cell. That is, the BS instructs the UTs to regulate the maximum Tx power.

Figure 2:
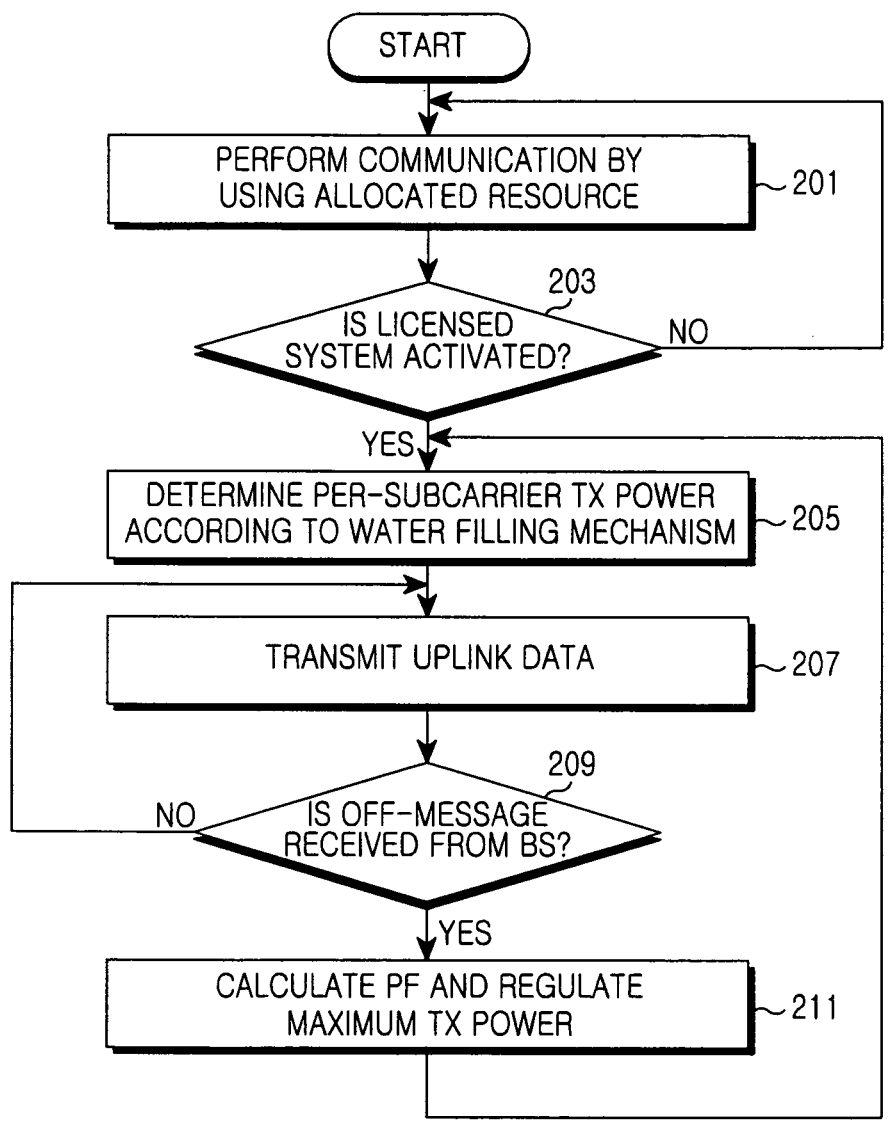
FIG. 2 illustrates a process of a User Terminal (UT) in a CR wireless communication system according to an embodiment of the present invention.

FIG. 2 illustrates a process of a UT in a CR wireless communication system according to an embodiment of the present invention.

Referring to FIG. 2, the UT performs communication by using a resource allocated by a BS in block 201. That is, the UT evaluates the allocated resource by analyzing a map message received from the BS, and performs communication by using the resource. In this case, a licensed system is in an inactive state. In other words, the licensed system is not using a resource of a frequency band used by the BS.

In block 203, the UT determines whether the licensed system is activated. That is, the UT persistently senses a signal of the licensed system while performing communication, and determines whether the signal of the licensed system is detected. The activation of the licensed system can be determined not only by the sensing from the UT but also by a report from the BS. If the licensed system remains in an inactive state, returning to block 201, the UT maintains communication with the BS.

Otherwise, if the licensed system is activated, proceeding to block 205, the UT determines per-subcarrier Tx power according to a water filling mechanism. In this case, by considering a constraint of the maximum Tx power and a Power Spectral Mask (PSM) for avoiding interference to the licensed system, the UT determines the per-subcarrier Tx power such that a sum rate is maximized. In this case, the farther the distance between the UT and the licensed system, the less the level of the constraint of the PSM. In other words, the UT is allowed to output greater Tx power than that of another UT of which a distance to the licensed system is less than that of the UT. Therefore, on the basis of the maximum allowed Tx power amount that is based on the distance to the licensed system, the per-subcarrier Tx power is determined such that the sum rate is maximized.

After determining the per-subcarrier Tx power, proceeding to block 207, the UT transmits uplink data. That is, the UT transmits the uplink data by applying the per-subcarrier Tx power determined in block 205. In this case, if the maximum Tx power regulation is performed at least one time, the UT transmits a PF together with the uplink data.

In block 209, the UT determines whether a binary message indicating 'off' is received from the BS. That is, the UT determines whether the maximum Tx power regulation is instructed from the BS. If the binary message indicating 'off' is not received, returning to block 207, the UT continues communication.

Otherwise, if the binary message indicating 'off' is received, proceeding to block 211, the UT determines the PF, and regulates the maximum Tx power by using the PF. More specifically, the UT determines a PP parameter, an RP parameter, and an FG parameter as shown in Equation (1) to Equation (4) above, and determines the PF as show in Equation (5) above. Then, the UT regulates the maximum Tx power by multiplying the PF by the current maximum Tx power as shown in Equation (6). Thereafter, returning to block 205, the UT re-determines the per-subcarrier Tx power.

Figure 3:
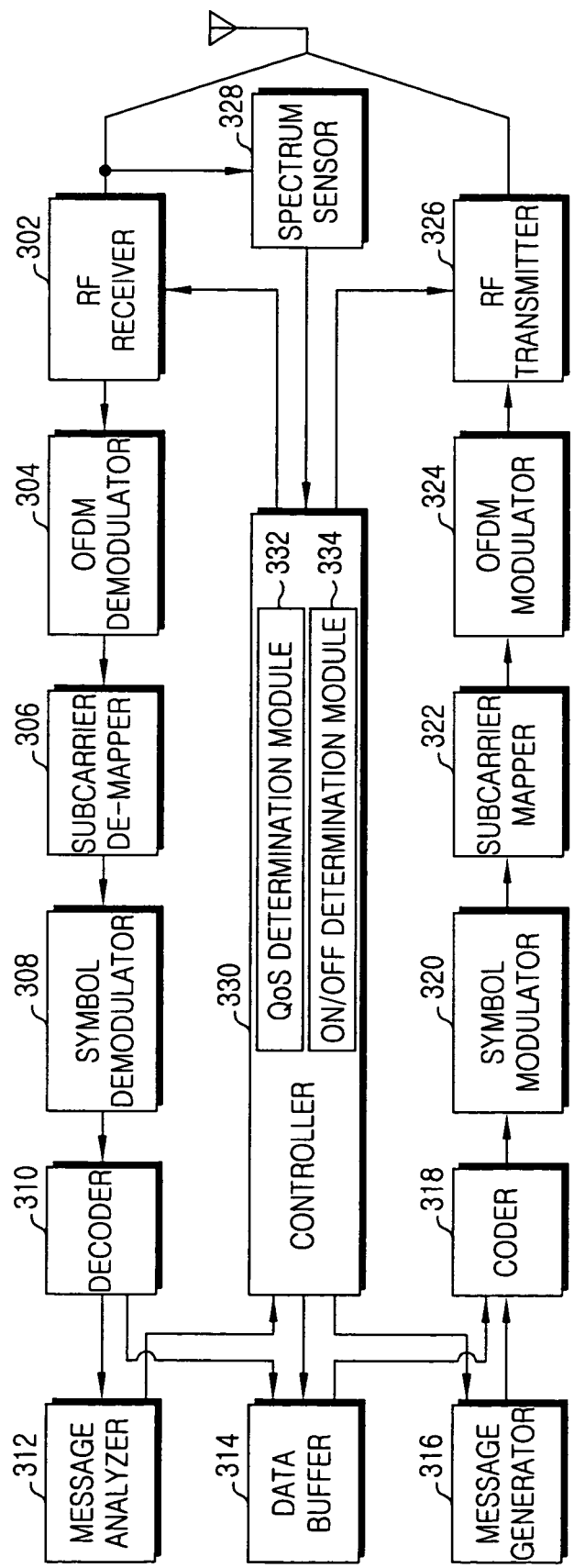
FIG. 3 illustrates a BS in a CR wireless communication system according to an embodiment of the present invention.

FIG. 3 illustrates a BS in a CR wireless communication system according to an embodiment of the present invention.

Referring to FIG. 3, the BS includes a Radio Frequency (RF) receiver 302, an OFDM demodulator 304, a subcarrier de-mapper 306, a symbol demodulator 308, a decoder 310, a message analyzer 312, a data buffer 314, a message generator 316, a coder 318, a symbol modulator 320, a subcarrier mapper 322, an OFDM modulator 324, an RF transmitter 326, a spectrum sensor 328, and a controller 330.

The RF receiver 302 down-converts an RF-band signal received through an antenna into a baseband signal. The OFDM demodulator 304 divides the baseband signal in an OFDM symbol unit, removes a Cyclic Prefix (CP), and thereafter restores frequency-band signals by performing a Fast Fourier Transform (FFT) operation. The subcarrier de-mapper 306 classifies the frequency-band signals in a processing unit. The symbol demodulator 308 demodulates the signals to convert them into a bit-stream. The decoder 310 decodes the bit-stream.

The message analyzer 312 analyzes a message received from an UT and a neighbor BS to evaluate information included in the message, and provides the evaluated information to the controller 330. In particular, the message analyzer 312 analyzes a binary message indicating 'on' or 'off'. The data buffer 314 temporarily stores data transmitted to and received from UTs. The message generator 316 receives, from the controller 330, information to be transmitted to the UT and the neighbor BS, and generates a message including the information. In particular, the message generator 316 generates the binary message indicating 'on' or 'off'. In this case, if the binary message is transmitted to the neighbor BS, the message generator 316 generates the binary message in a format of a CBP packet.

The coder 318 codes a Tx bit-stream provided from the message generator 316 and the data buffer 314. The symbol modulator 320 modulates the bit-stream to convert it into complex symbols. The subcarrier mapper 322 maps the complex symbols to a frequency domain. The OFDM modulator 324 converts signals mapped to the frequency domain into time-domain signals by performing an Inverse Fast Fourier Transform (IFFT) operation, inserts a CP, and thus configures baseband OFDM symbols. The RF transmitter 326 up-converts the baseband OFDM symbols into an RF-band signal, and thereafter transmits the RF-band signal through the antenna.

The spectrum sensor 328 senses a signal of a licensed system. That is, the spectrum sensor 328 searches for a frequency band not used by the licensed system and a channel in which a signal of the licensed system is detected. The spectrum sensor 328 also provides the sensing result to the controller 330.

The controller 330 provides overall control to the BS. For example; the controller 330 selects an operational channel by using the sensing result, and controls the RF receiver 302 and the RF transmitter 326 to transmit and receive a signal through a band of the operational channel. In particular, if the licensed system is activated, the controller 330 performs a function for interference cancellation. For this, a QoS determination module 332 included in the controller 330 determines whether each of UTs located in a cell satisfies QoS, and an on/off determination module 334 determines a value of the binary message according to whether the QoS is satisfied, the number of UTs not satisfying the QoS, an incremental gain level of maximum Tx power regulation, and so forth.

More specifically, by using at least one of a data rate and channel quality of the UTs, the QoS determination module 332 determines whether each UT satisfies the QoS. In this case, if all of the UTs satisfy the QoS, the on/off determination module 334 determines the value of the binary message broadcast to neighbor BSs to 'on'. Otherwise, if at least one of the UTs does not satisfy the QoS, the on/off determination module 334 determines the value of the binary message broadcast to the neighbor BSs to 'off'. However, in a case where an iteration level of maximum Tx power regulation is greater than or equal to 2, even if at least one UT does not satisfy the QoS, if the number of UTs not satisfying the QoS increases in comparison with a previous iteration level or if an incremental gain obtained by performing a regulation process using a PF decreases, the on/off determination module 334 determines the value of the binary message broadcast to the neighbor BSs to 'on'. The controller 330 also provides control such that the binary message set to the value determined by the on/off determination module 334 is broadcast to the neighbor BSs. Thereafter, upon receiving binary messages from the neighbor BSs, the on/off determination module 334 evaluates values of the received binary messages. If the evaluation result shows that the binary message indicating 'on' is received from all neighbor BSs, the on/off determination module 334 determines the value of the binary message broadcast to the UTs to 'on'. On the other hand, if the binary message indicating 'off' is received from at least one of the neighbor BSs, the on/off determination module 334 determines the value of the binary message broadcast to the UTs to 'off'. The controller 330 also provides control such that the binary message determined to the value determined by the on/off determination module 334 is broadcast to the UTs.

Figure 4:
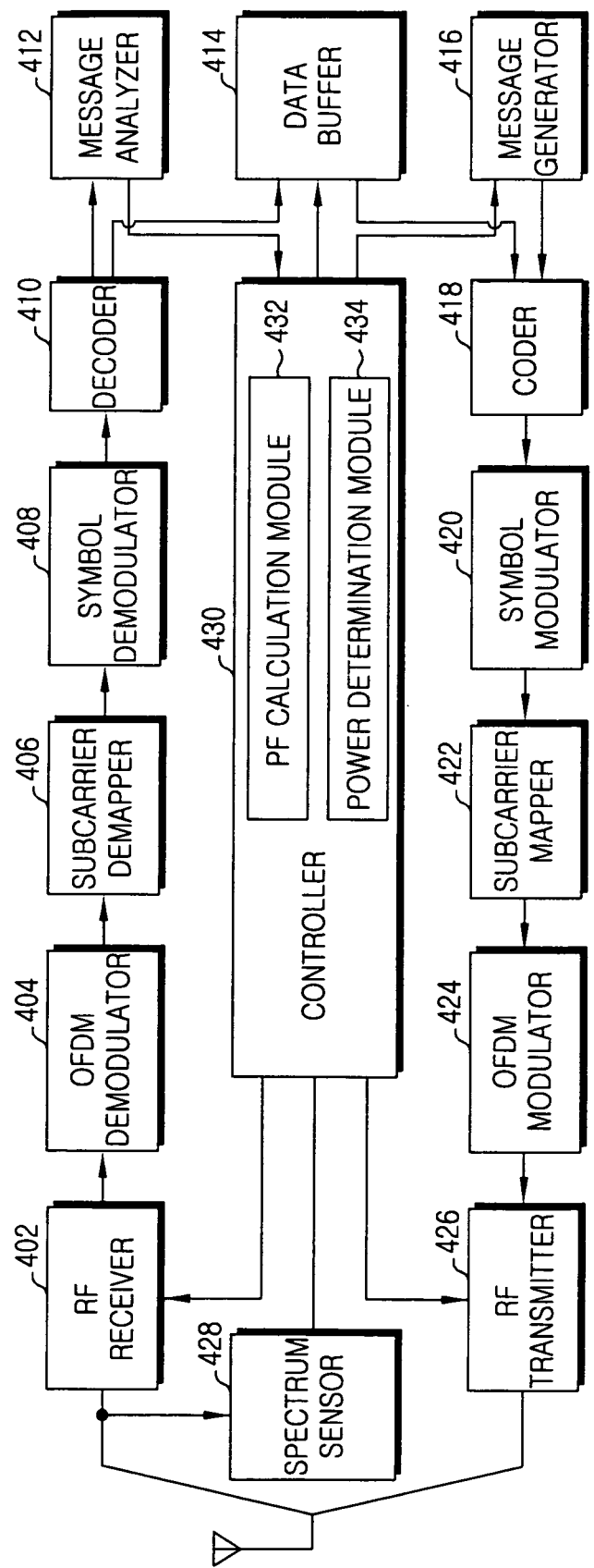
FIG. 4 illustrates a UT in a CR wireless communication system according to an embodiment of the present invention.

FIG. 4 illustrates a UT in a CR wireless communication system according to an embodiment of the present invention.

Referring to FIG. 4, the UT includes an RF receiver 402, an OFDM demodulator 404, a subcarrier demapper 406, a symbol demodulator 408, a decoder 410, a message analyzer 412, a data buffer 414, a message generator 416, a coder 418, a symbol modulator 420, a subcarrier mapper 422, an OFDM modulator 424, an RF transmitter 426, a spectrum sensor 428, and a controller 430.

The RF receiver 402 down-converts the RF-based signal received through an antenna into a baseband signal. The OFDM demodulator 404 divides the baseband signal in an OFDM symbol unit, removes a CP, and thereafter restores frequency-band signals by performing an FFT operation. The subcarrier demapper 406 classifies the frequency-band signals in a processing unit. The symbol demodulator 408 demodulates the signals to convert them into a bit-stream. The decoder 410 decodes the bit-stream.

The message analyzer 412 analyzes a message received from a BS to evaluate information included in the message, and provides the evaluated information to the controller 430. For example, the message analyzer 412 analyzes a map message received from the BS to evaluate an allocated resource. In particular, the message analyzer 412 analyzes a binary message indicating 'on' or 'off' received from the BS. The data buffer 414 temporarily stores data transmitted to and received from the BS. The message generator 416 receives, from the controller 430, information to be transmitted to the BS, and generates a message including the information. For example, the message generator 416 generates a message for announcing activation of a licensed system.

The coder 418 codes a Tx bit-stream provided from the data buffer 414 or the message generator 416. The symbol modulator 420 modulates the bit-stream to convert it into complex symbols. The subcarrier mapper 422 maps the complex symbols to a frequency domain. The OFDM modulator 424 converts signals mapped to the frequency domain into time-domain signals by performing an IFFT operation, inserts a CP, and thus configures baseband OFDM symbols. The RF transmitter 426 up-converts the baseband OFDM symbols into an RF-band signal, and thereafter transmits the RF-band signal through the antenna.

The spectrum sensor 428 senses a signal of the licensed system. That is, the spectrum sensor 428 searches for a frequency band not used by the licensed system and a channel in which a signal of the licensed system is detected. The spectrum sensor 428 also provides the sensing result to the controller 430.

The controller 430 provides overall control to the UT. For example, the controller 430 controls the RF receiver 402 and the RF transmitter 426 to transmit and receive a signal through a band of the operational channel. In particular, if the licensed system is activated, a power determination module 434 included in the controller 430 determines per-subcarrier Tx power. If maximum Tx power regulation is instructed by the BS, a PF calculation module 432 included in the controller 430 determines a PF, and the power determination module 434 regulates maximum Tx power according to the PF and, thereafter, re-determines the per-subcarrier Tx power.

More specifically, if the licensed system is activated, the power determination module 434 determines per-subcarrier Tx power according to a water filling mechanism. In this case, by considering a constraint of the maximum Tx power and a PSM, the power determination module 434 determines the per-subcarrier Tx power such that a sum rate is maximized. Thereafter, if the binary message indicating 'off' is received from the BS, the PF calculation module 432 determines the PF, and regulates the maximum Tx power by using the PF. In other words, the PF calculation module 432 determines a PP parameter, an RP parameter, and an FG parameter as shown in Equation (1) to Equation (4) above, and determines the PF as show in Equation (5) above. The power determination module 434 then regulates the maximum Tx power by multiplying the PF by the current maximum Tx power as shown in Equation (6), and thereafter re-determines the per-subcarrier Tx power.

According to some embodiments of the present invention, maximum Tx power of UTs is regulated in a semi-distributed manner in a CR wireless communication system, and thus interference to a licensed system can be avoided and performance of the CR wireless system can be maximized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a User Terminal (UT) in a Cognitive Radio (CR) wireless communication system, the method comprising:
    determining whether a signal of a licensed system is detected in at least one frequency band used by the CR wireless communication system, wherein the licensed system is a system that has priority of the at least one frequency band;
    when the signal of the licensed system is detected, determining, by a controller, a per-subcarrier Transmit (Tx) power according to a water filling mechanism in such a manner that a sum rate is maximized without exceeding a current maximum Tx power;
    upon receiving a binary message requesting to regulate the maximum Tx power from a Base Station (BS), determining, by the controller, a Penalty Factor (PF) based on at least one of the current maximum Tx power, the per-subcarrier Tx power, a per-subcarrier data rate, a minimum required data rate, and a threshold coefficient for a maximum allowed data rate; and
    regulating a new maximum Tx power by multiplying the PF by the current maximum Tx power.

2. The method of claim 1, wherein the determining of the PF comprises:
    determining a Power Penalty (PP) parameter which is in proportion to a sum of the per-subcarrier Tx power for all subcarriers allocated to the UT and which is in inverse proportion to the current maximum Tx power;
    determining a Rate Penalty (RP) parameter which increases with an increase of a sum of a ratio of a data rate for each subcarrier to the minimum required data rate and which decreases with an increase of the maximum allowed data rate coefficient;
    determining a Fairness Gain (FG) parameter which is in proportion to the data rate for each subcarrier and a sum of the per-subcarrier Tx power and which is in inverse proportion to the sum of the per-subcarrier data rate and the Tx power of each subcarrier;
    determining a first value which is an inverse number of a value obtained by subtracting the FG parameter from a sum of the RP parameter and the PP parameter; and
    determining as the PF a smaller value between 1 and a greater value between the first value and a second value, wherein the second value is a predetermined minimum value of the PF.

3. The method of claim 2, wherein the PP parameter is calculated according to:

$$PP_i = \frac{\sum_{k \in S_i} P_{i,k}}{P_i^{max}}, i = 1, 2, \ldots, L,$$

where $PP_i$ denotes a Power Penalty (PP) parameter of a UTi, k denotes a subcarrier index, $S_i$ denotes a subcarrier set allocated to the UTi, $P_{i,k}$ denotes power used for a subcarrier k of the UTi, $P_i^{max}$ denotes maximum power of the UTi, and L denotes a number of UTs.

4. The method of claim 2, wherein the RP parameter is calculated according to:

$$RP_i = \frac{\log\left(\sum_{k \in S_i} R_{i,k}/R_i^{min}\right)}{\log(\varepsilon)}, i = 1, 2, \ldots, L,$$

where RPi denotes a RP parameter of a UTi, $R_{i,k}$ denotes a data rate at a subcarrier k, $R_i^{min}$ denotes a minimum data rate of the UTi, $S_i$ denotes a subcarrier set allocated to the UTi, $\varepsilon$ denotes a threshold coefficient for a maximum allowed data rate, and L denotes a number of UTs.

5. The method of claim 2, wherein the FG parameter is calculated according to:

$$FG_i = \prod_{k \in S_i} \lambda_{i,k}, i = 1, 2, \ldots, L,$$

where FGi denotes a FG parameter of a UTi, $S_i$ denotes a subcarrier set allocated to the UTi, $\lambda_{i,k}$ denotes a quality indicator for a subcarrier k of the UTi, and L denotes a number of UTs.

6. The method of claim 2, wherein the PF is calculated according to:

$$PF_i(s+1) = \left[\frac{1}{RP_i(s) + PP_i(s) - FG_i(s)}\right]_{PF_i^{min}}^{1}, i = 1, 2, \ldots, L,$$

and wherein s denotes an iteration count index and $PF_i^{min}$ denotes a minimum value of the PF.

7. The method of claim 1, further comprising, when uplink data is transmitted after regulating the maximum Tx power, transmitting the PF to the BS.

8. The method of claim 1, wherein determining the per-subcarrier Tx power according to the water filling mechanism comprises considering the current maximum Tx power and a Power Spectral Mask (PSM) for avoiding interference to the licensed system.

9. The method of claim 1, further comprising:
persistently sensing the signal of the licensed system while performing communication.

10. The method of claim 1, further comprising:
receiving, by the UT, a report indicating that the licensed system is activated when the signal of the licensed system is detected.

11. A User Terminal (UT) apparatus in a Cognitive Radio (CR) wireless communication system, the apparatus comprising:
a controller configured to determine whether a signal of a licensed system is detected in at least one frequency band used by the CR wireless communication system, wherein the licensed system is a system that has priority of the at least one frequency band;
wherein the controller further is configured to:
determine a per-subcarrier Transmit (Tx) power according to a water filling mechanism in such a manner that a sum rate is maximized without exceeding a current maximum Tx power when the signal of the licensed system is detected,
determine, upon receiving a binary message requesting to regulate the maximum Tx power from a Base Station (BS), a Penalty Factor (PF) based on at least one of the current maximum Tx power, the per-subcarrier Tx power, a per-subcarrier data rate, a minimum required data rate, and a threshold coefficient for a maximum allowed data rate, and
regulate a new maximum Tx power by multiplying the PF by the current maximum Tx power.

12. The apparatus of claim 11, wherein the controller is further configured to:
determine a Power Penalty (PP) parameter which is in proportion to a sum of the per-subcarrier Tx power for all subcarriers allocated to the UT and which is in inverse proportion to the maximum Tx power,
determine a Rate Penalty (RP) parameter which increases with an increase of a ratio of a data rate for each subcarrier to the minimum required data rate and which decreases with an increase of the maximum allowed data rate coefficient,
determine a Fairness Gain (FG) parameter which is in proportion to the data rate for each subcarrier and a sum of the per-subcarrier Tx power and which is in inverse proportion to the sum of the per-subcarrier data rate and the Tx power of each subcarrier,
determine a first value which is an inverse number of a value obtained by subtracting the FG parameter from a sum of the RP parameter and the PP parameter, and
determine as the PF a smaller value between 1 and a greater value between the first value and a second value, wherein the second value is a predetermined minimum value of the PF.

13. The apparatus of claim 12, wherein the PP parameter is calculated according to:

$$PP_i = \frac{\sum_{k \in S_i} P_{i,k}}{P_i^{max}}, i = 1, 2, \ldots, L,$$

where $PP_i$, denotes a Power Penalty (PP) parameter of a UTi, k denotes a subcarrier index, $S_i$ denotes a subcarrier set allocated to the UTi, $P_{i,k}$ denotes power used for a subcarrier k of the UTi, $P_i^{max}$ denotes maximum power of the UTi, and L denotes a number of UTs.

14. The apparatus of claim 12, wherein the RP parameter is calculated according to:

$$RP_i = \frac{\log\left(\sum_{k \in S_i} R_{i,k}/R_i^{min}\right)}{\log(\varepsilon)}, i = 1, 2, \ldots, L,$$

where RPi denotes a RP parameter of a UTi, $R_{i,k}$ denotes a data rate at a subcarrier k, $R_i^{min}$ denotes a minimum data rate of the UTi, $S_i$ denotes a subcarrier set allocated to the UTi, ε denotes a threshold coefficient for a maximum allowed data rate, and L denotes a number of Uts.

15. The apparatus of claim 12, wherein the FG parameter is calculated according to:

$$FG_i = \prod_{k \in S_i} \lambda_{i,k}, i = 1, 2, \ldots, L,$$

where FGi denotes a FG parameter of a UTi, $S_i$ denotes a subcarrier set allocated to the UTi, $\lambda_{i,k}$ denotes a quality indicator for a subcarrier k of the UTi, and L denotes a number of UTs.

16. The apparatus of claim 12, wherein the PF is calculated according to:

$$PF_i(s+1) = \left[\frac{1}{RP_i(s) + PP_i(s) - FG_i(s)}\right]^1_{PF_i^{min}}, i = 1, 2, \ldots, L,$$

and wherein s denotes an iteration count index and $PF_i^{min}$ denotes a minimum value of the PF.

17. The apparatus of claim 11, further comprising a transmitter configured to transmit the PF to the BS when uplink data is transmitted after regulating the maximum Tx power.

18. The apparatus of claim 11, wherein determining the per-subcarrier Tx power according to the water filling mechanism comprises considering the current maximum Tx power and a Power Spectral Mask (PSM) for avoiding interference to the licensed system.

19. The apparatus of claim 11, wherein the controller is configured to:
persistently sense the signal of the licensed system while performing communication.

20. The apparatus of claim 11, wherein the controller is configured to:
receive, from the base station, a report indicating that the licensed system is activated when the signal of the licensed system is detected.

* * * * *